United States Patent Office 3,459,704
Patented Aug. 5, 1969

3,459,704
COMPOSITIONS OF ORGANIC MATERIAL STABILIZED WITH CERTAIN ESTERS OF SUBSTITUTED HYDROQUINONES AND ORGANIC ACIDS
Janet Brooks Peterson, Yonkers, and Martin Dexter, Briarcliff Manor, N.Y., assignors to Geigy Chemical Corporation, Greenburgh, N.Y., a corporation of Delaware
No Drawing. Original application Sept. 17, 1962, Ser. No. 224,602, now Patent No. 3,294,836, dated Dec. 17, 1966. Divided and this application Oct. 31, 1966, Ser. No. 590,549
Int. Cl. C08f 45/58; A21d 2/28
U.S. Cl. 260—45.85                    20 Claims

ABSTRACT OF THE DISCLOSURE

Unstable organic material is stabilized with certain esters of 2-lower alkyl-1,4-hydroquinone and derivatives thereof. This invention is particularly useful in stabilizing polyolefins such as polypropylene and polyethylene. A particularly preferred stabilizer compound is 3,5-di-t-butyl - 4 - hydroxyphenyl β - (n - octadecyl-mercapto) propionate.

THE INVENTION

This application is a division of our co-pending application Ser. No. 224,602 filed Sept. 17, 1962, now U.S. Patent No. 3,294,836.

This invention relates to the stabilization of polypropylene and other unstable organic material with derivatives of certain alkanoic acids, in particular with stabilizers which are esters formed from certain substituted hydroquinones. The invention also relates to a method of preparing stabilized polypropylene and/or other organic material subject to degradation.

More specifically, the invention pertains to stabilization of polypropylene and/or other organic material normally subject to oxidative or other deterioration with a stabilizer of the Formula I:

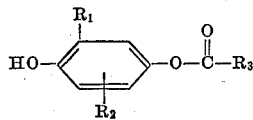

wherein:

$R_1$ is an alkyl group, especially of 3 to 8 carbon atoms, preferably a secondary or a tertiary alkyl group, e.g. t-butyl, sec.-octyl,
$R_2$ represents either hydrogen or one or more alkyl groups, which may be the same or different—e.g. of from 1 to 8 carbon atoms, preferably a secondary or tertiary alkyl adjacent to OH— but in the case of a tertiary alkyl group it is understood that bulky groups as the tertiary butyl group are not contemplated in positions adjacent to one another in the phenyl nucleus;
$R_3$ represents alkylthioalkyl and the group

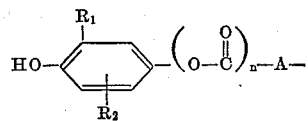

wherein:

A is alkylene, alkylenethioalkylene, or phenylene,
$n$ is 0 or 1, and
$R_1$ and $R_2$ are the same as above.

In the foregoing formula, $R_1$ may be methyl, ethyl, propyl, butyl, pentyl, hexyl, heptyl, octyl,
$R_2$ may be methyl, ethyl, propyl, butyl, pentyl, hexyl, heptyl, octyl,
$R_3$ may be alkylthioalkyl having 2 to 24 carbon atoms, e.g. methylthiomethyl, ethylthioethyl, propylthioethyl, butylthiopropyl, dodecylthioethyl, octadecylthioethyl, eicosylthiobutyl, etc.;
A may be alkylene or alkylenethioalkylene, in which the alkylene moiety or moieties may be methylene, ethylene, propylene, butylene, pentylene, hexylene, heptylene, octylene; the phenylene group may be unsubstituted or substituted, e.g. with halogen, alkyl, alkoxy, hydroxyl, alkylthio, carboalkoxy, etc.

The compounds of the Formula I are novel and especially useful in the stabilizing of polypropylene either as sole stabilizer, or in combination with other stabilizers such as light stabilizers and/or other thermal stabilizers, antioxidants, etc. Combinations of two or more stabilizers of the Formula I are also useful in stabilizing polypropylene.

In another aspect of the invention, a useful method of stabilizing polypropylene comprises incorporating in said polypropylene a stabilizing amount of a stabilizer of the Formula I wherein $R_1$, $R_2$, $R_3$ and A are defined the same as above, and in addition $R_3$ also includes alkyl, preferably having more than 10 carbon atoms, such as alkyl from 11 to 24 carbon atoms, e.g. undecyl, dodecyl, tridecyl, tetradecyl, pentadecyl, hexadecyl, octadecyl, nonadecyl, eicosyl, heneicosyl, docosyl, tricosyl, tetracosyl.

It is an object of the invention to provide stable organic material, e.g. stable polyolefinic material, preferably stable polypropylene and polyethylene. Preferably the polyolefins are of high molecular weight, e.g., above 1000 into the hundreds of thousands range. The polyethylene may be of high density, medium density or low density class.

Polymeric materials such as the foregoing find use as thermoplastic molding or coating agents. Moreover, because of their high dielectric strength and their resistance to water, they are particularly useful as insulators or dielectrics in condensers and other such equipment. It is known that these polyolefins, e.g. polyethylene and polypropylene, are attacked by oxygen, particularly when exposed to the atmosphere and at elevated temperatures. For example, during use or manufacture the desirable properties of the polyolefins may be impaired due to oxidative deterioration. Such degradation causes loss in dielectric properties, discoloration, embrittlement, gelation, etc. Thermal degradation is also checked by the invention.

Not only homopolymeric material, but also copolymers and physical mixtures thereof are stabilized according to the present invention. For example, high impact polystyrene containing copolymers of butadiene and styrene are stabilized according to the invention.

The invention is also useful in stabilizing lubricating oils of various types including aliphatic esters such as, e.g. dihexyl azelate, di-(2-ethylhexyl)azelate, di-(3,5,5-trimethylhexyl)glutarate, di - (3,5,5 - trimethylpentyl) glutarate, di - (2 - ethylhexyl)pimelate, di - (2 - ethylhexyl)adipate, diisoamyl adipate, triamyl tricarballylate, pentaerythritol tetracaproate, dipropylene glycol dipelargonate, 1,5-pentanediol-di-(2-ethylhexanoate), etc.

The present invention also relates to the stabilizing of fatty materials including oils of animal and vegetable origin which tend to deteriorate on standing and exposure to atmospheric oxygen. Among the edible fats and oils within the scope of the present invention are: linseed oil, menhaden oil, cod liver oil, castor oil, olive oil, rapeseed oil, coconut oil, palm oil, corn oil, sesame oil, peanut oil, cotton seed oil, butter, fat, lard, beef tallow, etc. Other oils and fats which deteriorate on standing and exposure to oxygen in the air or oxygen at elevated temperatures are all within the scope of the present invention.

Within the scope of the invention also are saturated and unsaturated hydrocarbons which tend to deteriorate on storage such as, e.g. gasolines, both natural and synthetic, in particular, saturated and unsaturated gasolines, etc.; jet fuel; diesel oil; mineral oil; fuel oil; drying oil; waxes; resins; etc. Such hydrocarbons are protected against gum formation, discoloration and other deterioration with the stabilizers of the present invention.

It is furthermore an object of the present invention to provide novel stabilizers of the Formula I which are versatile and effective stabilizers in at least a single class of the foregoing organic materials which are normally subject to deterioration caused by exposure to light and/or heat and/or oxygen, etc.

A particularly preferred stabilizer of the invention is 3,5-di-t-butyl-4-hydroxyphenyl β-(n-octadecylmercapto)propionate which is especially useful in stabilizing polyolefinic material, e.g. polypropylene and polyethylene.

It is understood that the stabilizers of the invention are not necessarily of equivalent potency. The specific stabilizer most useful to a given unstable material will depend upon several factors for its advantages. Availability and cost of raw materials for the manufacture of the stabilizer and effective inhibitory action of the stabilizer including duration and degree of activity are among the factors which control the choice of a specific stabilizer for a specific substrate which is normally subject to deterioration. Toxicity, color, stability to light and/or heat and solubility are also important factors.

In general, stabilizers of the invention are employed in a concentration of from about 0.001% to about 5% by weight, preferably from about 0.1% to about 1% by weight. The specific concentration used varies with the substrate and the stabilizer, but the following ranges are preferred.

Concentration of about 0.001% to about 1% by weight for the stabilizer in polyethylene are useful. In polypropylene from about 0.05% to about 1% by weight of stabilizer is especially useful. In mineral oils, concentrations of from about 0.005% to about 1% by weight of stabilizer are used. Gasolines are stabilized with from about 0.001% to about 0.1% by weight of stabilizer, preferably about 0.05% by weight. Fatty material of animal origin such as lard is stabilized with from about 0.001% to about 0.1% by weight of stabilizer. Oils of vegetable origin such as cotton seed oil are similarly stabilized with from about 0.001% to about 0.1% by weight of stabilizer.

Hydrocarbon material such as cycloolefins, e.g. cyclohexene, is advantageously stabilized with from about 0.001% to about 1% by weight of the stabilizers of the present invention. Similar concentrations of stabilizer are used to stabilize aldehydes such as, e.g. about 0.01% by weight in heptaldehyde. High temperature lubricants which are essentially synthetic esters of alkanoic acids, e.g. trimethylolpropane tripelargonate, diisoamyladipate, are stabilized with from about 0.5% to about 5%, preferably about 2%, by weight of a stabilizer according to the invention.

The compounds of this invention may be used also to stabilize organic material in combination with other additive agents such as, e.g. antioxidants, pourpoint depressants, corrosion and rust inhibitors, dispersing agents, demulsifiers, antifoaming agents, carbon black, accelerators and other chemicals used in rubber compounding, plasticizers, color stabilizers, heat stabilizers, ultraviolet absorbers, dyes, pigments, metal chelating agents, etc.

A particularly useful stabilizer system comprises a stabilizer of the Formula I and di-lauryl-β-thio-di-propionate (hereinafter referred to as DLTDP). Generally from about 0.005% to about 10% (based on the stabilized composition) by weight of DLTDP and other stabilizers, e.g. of the Formula I, are employed. Polypropylene is advantageously stabilized with about 0.1% to 0.5% by weight of DLTDP and 0.1% to 0.5% by weight of a stabilizer of the Formula I. In addition, compounds similar to Formula I wherein $R_3$ is alkyl may be used in combination with DLTDP.

In place of DLTDP, other similar diesters are usefully employed with the stabilizers of the Formula I, wherein $R_3$ may also be alkyl as mentioned above, for stabilization of organic material, e.g., polypropylene. Such diesters as the following are useful:

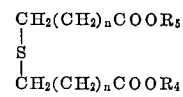

wherein:

$n$ is a small number, e.g. 1 or 2; and $R_4$ and $R_5$ are each independently an alkyl group, e.g. having 8 to 24 carbon atoms, such as octyl, nonyl, decyl, undecyl, dodecyl, tridecyl, tetradecyl, pentadecyl, hexadecyl, heptadecyl, octadecyl, eicosyl, heneicosyl, tricosyl, tetracosyl.

The stabilizer compounds of the Formula I are prepared in a number of ways. Thus, for example, compounds of the Formula I are prepared by reaction of the appropriate acyl halide with the appropriate substituted hydroquinone. It is possible to prepare most of the compounds of the Formula I, including additionally, those compounds wherein $R_3$ is alkyl in Formula I by this method. In the latter case the simple alkanoylchloride, e.g. acetylchloride, is used. Alternatively, the appropriate acid or acid anhydride can be used.

The esters are prepared by reaction of the appropriate precursor acid, acyl halide or anhydride, and the hydroquinone, if desired in a non-polar solvent such as benzene. The reaction may be carried out in a closed vessel under nitrogen. Pyridine is useful as a base to remove HCl when the acyl chloride is used.

The following examples are illustrative of the invention only, and there is no intention to limit the scope of the invention thereto. In the following examples parts are by weight, unless otherwise specified, and temperature is in degrees centigrade. The relationship between parts by weight and parts by volume is as grams to cubic centimeters.

EXAMPLES

Part I.—Intermediates

Example 1. — β - (n - octadecylmercapto)propionate acid.—Methyl β-(n-octadecylmercapto)propionate is prepared from 172 parts of 1-octadecanethiol, 54.3 parts of methyl acrylate and 1 part of 40% benzyltrimethylammonium methoxide by a procedure similar to that described by Kharasch and Fuchs, J. Org. Chem. 13, 100 (1948). The ester is hydrolyzed without isolation by the addition at 40° of 125 parts of isopropanol followed by 38 parts of sodium hydroxide dissolved in 90 parts of water and 180 parts of water. The reaction mixture is refluxed for 1 hour at 81° and the hot solution then poured slowly with stirring into 315 parts of 3 N hydrochloric acid cooled in an ice-water bath. The precipitated off-white solid is filtered, washed with water until it is free of chloride and dried. In this way 212.5 parts of the desired β-(n-octadecylmercapto) propionic acid are obtained, M.P. 75–78°.

Analysis.—Calculated for $C_{21}H_{42}O_2S$: Neutral equivalent, 358.6. Found: Neutral equivalent, 378.

Example 2.—β-(n-octadecylmercapto)propionyl chloride.—β - (n - octadecylmercapto)propionic acid (71.7 parts) is treated with 47.6 parts of thionyl chloride at 40° and the temperature of the reaction mixture is maintained at 25–35° with stirring for ½ hour and at 35–50° for an additional ½ hour. The excess thionyl chloride is removed by distillation under reduced pressure. The residue consists of 76 parts of β-(n-octadecylmercapto) propionyl chloride, M.P. 32–35°.

Example 3.—β - (3,5 - di-t-butyl-4-hydroxyphenyl)propionyl chloride.—β-(3,5-di-t-butyl-4-hydroxyphenyl)propionic acid (8.35 parts), prepared by aqueous methanolic potassium hydroxide hydrolysis of methyl β-(3,5-di-t-butyl-4-hydroxyphenyl)propionate is added in portions to a stirred solution of 7.14 parts of thionyl chloride dissolved in 30 parts of chloroform over a period of 5–10 minutes at 35–40°. The temperature of the reaction mixture is maintained at 35–40° with stirring for an additional 2¼ hours. The excess thionyl chloride and chloroform are removed by distillation under reduced pressure. The residue consists of 9 parts of pale yellow, crystalline β-(3,5-di-t-butyl-4-hydroxyphenyl)propionyl chloride. A portion of this material is recrystallized from petroleum ether, and it is obtained as a white crystalline solid melting at 71–74°.

Part II.—Stabilizer compounds

Example 4.—3,5-di-t-butyl-4-hydroxyphenyl stearate.—2,6-di-t-butyl-1,4-hydroquinone (5.53 parts) is dissolved in 45 parts of benzene with stirring under nitrogen and 1.98 parts of pyridine are added. This solution is warmed to 45° and 7.58 parts of stearoyl chloride are added in portions. The reaction mixture is stirred under nitrogen at 45° for an additional 2¼ hours and is then cooled to room temperature. The precipitated pyridine hydrochloride is filtered and washed with benzene, and the benzene is stripped from the combined filtrate and washing in vacuo. The residue (12.0 parts) crystallizes to a pale yellow waxy solid on cooling, and after recrystallization from methanol, 8.5 parts of 3,5-di-t-butyl-4-hydroxyphenyl stearate are obtained as a white crystalline powder, M.P. 35–39°.

Analysis.—Calculated for $C_{32}H_{56}O_3$: C, 78.63%; H, 11.55%. Found: C, 78.67%; H, 11.97%.

In a similar manner by using 2,6-di-t-octyl-1,4-hydroquinone above, then 3,5-di-t-octyl-4-hydroxyphenyl stearate is obtained.

Example 5.—3.5-di-t-butyl-4-hydroxyphenyl β-(n-octadecylmercapto)propionate.—β - (n - octadecylmercapto) propionyl chloride (75.4 parts) dissolved in 200 parts of benzene is added in portions to 44.4 parts of 2,6-di-t-butyl-1-,4-hydroquinone and 15.8 parts of pyridine dissolved in 250 parts of benzene at 40° with stirring under nitrogen. The reaction mixture is stirred for 3½ hours under nitrogen at 45–50°. When the mixture has cooled to room temperature the pyridine hydrochloride which had precipitated is filtered off, and the benzene filtrate allowed to stand over anhydrous magnesium sulfate. After filtration of the benzene solution, the benzene is removed by distillation in vacuo and the residue, 120 parts of a brownish syrup, crystallizes. The crude product is washed and triturated with methanol, dried, and recrystallized from petroleum ether. In this way 72 parts of white, crystalline 3,5-di-t-butyl-4-hydroxyphenyl β-(n-octadecylmercapto) propionate are obtained, M.P. 51.5–53°.

Analysis.—Calculated for $C_{35}H_{62}O_3S$: C, 74.67%; H, 11.10%; S, 5.70%. Found: C, 74.64%; H, 10.99%; S, 5.78%.

Example 6.—Bis(3,5-di-t-butyl-4-hydroxyphenyl) adipate.—2,6-di-t-butyl-1,4-hydroquinone (8.88 parts) and 3.16 parts of pyridine are dissolved in 45 parts of benzene with stirring under nitrogen. The solution is warmed up to 40° and 3.66 parts of adipyl chloride are added in portions. The reaction mixture is stirred under nitrogen at 45° for 3 hours. An additional 8 parts of benzene are added during the last half hour. After the reaction mixture has cooled to room temperature, the insoluble solid (12.5 parts) is filtered, washed with benzene and dried. The solid, which is a mixture of pyridine hydrochloride and the desired product, is taken up in 60 parts of water and 70 parts of ether, shaken well and the layers separated. The ether layer is washed once with 30 parts of water, filtered, and the ether removed in vacuo. The residue (7 parts) is recrystallized from a mixture of hexane and ethyl acetate (3:1 by volume), and 4.5 parts of white, crystalline bis (3,5-di-t-butyl-4-hydroxyphenyl) adipate are obtained, M.P. 157–159°.

Analysis.—Calculated for $C_{34}H_{50}O_6$: C, 73.61%; H, 9.09%. Found: C, 73.91%; H, 8.98%.

Example 7.—Bis(3,5-di-t-butyl-4-hydroxyphenyl) sebacate.—2,6-di-t-butyl-1,4-hydroquinone (8.88 parts) and 3.16 parts of pyridine are dissolved in 45 parts of benzene with stirring under nitrogen. The solution is warmed to 44° and 4.78 parts of sebacyl chloride are added in portions. The reaction mixture is stirred under a nitrogen atmosphere at 45–50° for 3 hours. After the reaction mixture has cooled to room temperature, the precipitated pyridine hydrochloride is filtered, and the benzene filtrate concentrated to dryness in vacuo. The crude residue (13.5 parts) is dissolved in 30–40 parts of petroleum ether and the solution is washed once with 10 parts of 5% sodium carbonate and twice with 10 parts of water. The petroleum ether solution is warmed on the steam bath a few minutes, allowed to cool slowly, and finally refrigerated. The crystalline product (7.5 parts) obtained upon filtration of the cold solution is triturated with warm petroleum ether, refrigerated, filtered, washed with cold petroleum ether and dried. In this manner, 6.5 parts of white, crystalline bis(3,5-di-t-butyl-4-hydroxyphenyl) sebacate are obtained, M.P. 98–100°.

Analysis.—Calculated for $C_{38}H_{58}O_6$: C, 74.71%; H, 9.57%. Found: C, 74.87%; H, 9.71%.

Example 8.—Bis(3,5-di-t-butyl-4-hydroxyphenyl) 3,3'-thiodipropionate.—2,6-di-t-butyl-1,4-hydroquinone (8.88 parts) and 3.16 parts of pyridine are dissolved in 45 parts of benzene with stirring under nitrogen. The solution is warmed to 40–50° and 4.94 parts of 3,3'-thiodipropionyl chloride, B.P. 126–127°/1.5 mm., $n_D^{29.7}$ 1.5169, are added in portions. (The acid chloride is prepared from 3,3'-thiodipropionic acid and excess thionyl chloride in 71% yield, see Schmidt and Schnetzer, Helv. Chim. Acts 34, 894–7 (1951). The reaction mixture is maintained at 40–50° with stirring in a nitrogen atmosphere for 3 hours. After the reaction mixture has cooled to room temperature, the precipitated pyridine hydrochloride is filtered, and the benzene filtrate is concentrated to dryness in vacuo. The crude residue (13 parts) is dissolved in 70 parts of ether and the ether solution washed in turn with 50 parts of water, 30 parts of 5% sodium hydroxide and twice with 30 parts of water. The ether solution is dried over anhydrous magnesium sulfate, filtered, the ether removed in vacuo, and the crystalline residue (10.5 parts) is recrystallized from hexane. In this way, 7.5 parts of white, recrystalline bis(3,5-di-t-butyl-4-hydroxyphenyl)3,3'-thiodipropionate are obtained, M.P. 118–120°.

Analysis.—Calculated for $C_{34}H_{50}O_6S$: C, 69.59%; H, 8.59%; S, 5.46%. Found: C, 69.25%; H, 8.42%; S, 5.66%.

Example 9.—Bis - (3,5 - di-t-butyl-4-hydroxyphenyl) terephthalate.—2,6 - di-t-butyl-1,4-hydroquinone (11.1 parts) and 3.95 parts of pyridine are dissolved in 40 parts of benzene with stirring under nitrogen. The solution is warmed to 45–47° and 5.08 parts of terephthaloyl chloride dissolved in 20–25 parts of benzene are added in portions. The reaction mixture is maintained with stirring for 3 hours at 45–50° under a nitrogen atmosphere. When the reaction mixture has cooled to room temperature, the precipitated solid (18 parts) which consists of both the desired product and pyridine hydrochloride, is filtered, washed with benzene, and dried. The solid is stirred for a short period in 100 parts of water containing a drop of sodium lauryl sulfate, filtered, and the filter cake washed until the wash liquors are free of chloride ion. The dried bis(3,5 - di-t-butyl-4-hydroxyphenyl) terephthalate (12 parts) is obtained as a white, crystalline powder, M.P. 269–272.5°.

Analysis.—Calculated for $C_{36}H_{46}O_6$: C, 75.23%; H, 8.07%. Found: C, 74.90%; H, 7.95%.

Example 10.—3 - t - butyl - 4 - hydroxyphenyl β-(n-octadecylmercapto) propionate.—β - (n - octadecylmercapto)propionyl chloride (11.3 parts) dissolved in 35 parts of benzene is added in portions to 4.98 parts of 2-t-butyl-1,4-hydroquinone and 2.37 parts of pyridine dissolved in 40 parts of benzene at 42° with stirring under nitrogen. The reaction mixture is stirred for 2½ hours under nitrogen at 45–50°. When the mixture has cooled to room temperature, the pyridine hydrochloride which had precipitated is filtered off and the benzene filtrate treated with 60 parts of ether and 50 parts of water. The mixture is shaken and the layers separated. The benzene-ether layer is washed twice with 30 parts of water and dried over anhydrous magnesium sulfate. After the solution is filtered, the solvents are removed by distillation in vacuo, and the crude crystalline residue (14.5 parts) is recrystallized from petroleum ether. In this manner 11.5 parts of the desired product are obtained as an off-white crystalline powder, M.P. 58–60°.

Analysis.—Calculated for $C_{31}H_{54}O_3S$: C, 73.46%; H, 10.74%; S, 6.33%. Found: C, 73.53%; H, 10.73%; S, 6.44%.

Example 11.—Bis(3 - t - butyl - 4 - hydroxyphenyl) adipate.—2 - t - butyl - 1,4 - hydroquinone (16.6 parts) and 7.9 parts of pyridine are dissolved in 110 parts of benzene with stirring under nitrogen. The solution is warmed to 45° and 9.15 parts of adipyl chloride are added in portions. An oil precipitates almost immediately. The reaction mixture is stirred under nitrogen at 45–50° for 4½ hours. A portion of the benzene solvent is removed by evaporation and the concentrate is treated with 150 parts of water and 175 parts of ether, the mixture shaken, and the layers separated. The ether layer is washed twice with 75 parts of water, the ether solution filtered, and the ether removed in vacuo. The crude solid residue (30 parts) is recrystallized from a mixture of hexane and ethyl acetate (2:1 by volume), and 12.5 parts of the desired product are obtained as a white, crystalline powder, M.P. 168–171.5°.

Analysis.—Calculated for $C_{26}H_{34}O_6$: C, 70.56%; H, 7.74%. Found: C, 70.56%; H, 7.64%.

Example 12.—Bis(3 - t - butyl - 4 - hydroxyphenyl) sebacate.—2 - t - butyl - 1,4-hydroquinone (16.6 parts) and 7.9 parts of pyridine are dissolved in 110 parts of benzene with stirring under nitrogen. The solution is warmed to 47° and 12 parts of sebacyl chloride are added in portions. An oil precipitates almost immediately. The reaction mixture is stirred under a nitrogen atmosphere at 45–50° for 3–4 hours. A portion of the benzene solvent is removed by evaporation and the remainder of the benzene is decanted from the now solidified oil. The solid is taken up in 150 parts of water and 175 parts of ether, the mixture shaken, and the layers separated. The ether layer is washed in turn with 75 parts of water, 75 parts of water containing 10 parts of 10% sodium carbonate and 15 parts of saturated sodium chloride, and twice with 75 parts of water. The ether solution is dried over anhydrous magnesium sulfate, filtered, and the ether removed in vacuo. The residual viscous yellow syrup (21.5 parts) is crystallized by trituration with n-hexane and purified by trituration and washing with petroleum ether. The dried product is obtained as a white, crystalline powder (19.5 parts), M.P. 75–79.5°.

Analysis.—Calculated for $C_{30}H_{42}O_6$: C, 72.26%; H, 8.49%. Found: C, 71.99%; H, 8.43%.

Example 13.—Bis(3 - t - butyl - 4 - hydroxyphenyl)3,3'-thiodipropionate.—2 - t - butyl - 1,4 - hydroquinone (10.2 parts) and 4.84 parts of pyridine are dissolved in 65–70 parts of benzene with stirring under nitrogen. The solution is warmed to 47° and 6.6 parts of 3,3'-thiodipropionyl chloride are added in portions. The reaction mixture is maintained at 45–50° with stirring in a nitrogen atmosphere for 2 hours. After the reaction mixture has cooled to room temperature, the benzene layer is siphoned off from the precipitated oily lower layer and the residual oil is taken up in 100 parts of water and 105 parts of ether. The mixture is shaken and the layers separated. The ether layer is washed in turn with 50 parts of water, 50 parts of water containing 6 parts of 10% sodium carbonate, 50 parts of water containing 10 parts of saturated sodium chloride solution, and finally, twice with 50 parts of water. The ether layer is dried over anhydrous magnesium sulfate, filtered, and the ether then removed in vacuo. The residue (14.5 parts), a yellow glass, is triturated and washed with hot petroleum ether and dried.

Analysis.—Calculated for $C_{26}H_{34}O_6S$: C, 65.80%; H, 7.22%; S, 6.76%. Found: C, 66.19%; H, 7.35%; S, 6.62%.

Example 14.—Bis(3 - t - butyl - 4 - hydroxyphenyl) terephthalate.—2 - t - butyl - 1,4-hydroquinone (8.3 parts) and 3.95 parts of pyridine are dissolved in 45 parts of benzene and 5.08 parts of terephthaloyl chloride dissolved in 25 parts of benzene are added (see Example 9). The reaction is carried out and the desired product, 11 parts, M.P. 259–265° (decomp.), is isolated as described in the above Example 9.

Analysis.—Calculated for $C_{28}H_{30}O_6$: C, 72.71%; H, 6.54%. Found: C, 72.51%; H, 6.31%.

Example 15.—3,5 - di- t - butyl - 4 - hydroxyphenyl laurate.—2,6 - di- t - butyl - 1,4 - hydroquinone (5.53 parts) is treated with 5.50 parts of lauroyl chloride in the presence of 1.98 parts of pyridine dissolved in 45 parts of benzene (see Example 4). The reaction is carried out and the crude product (10 parts) is isolated as described in Example 4. For purification, the crude product is dissolved in 20 parts of petroleum ether, the solution extracted with 10 parts of 5% sodium carbonate and the layers separated. The petroleum ether solution is dried over anhydrous magnesium sulfate, filtered, and the petroleum ether stripped off in vacuo. In this manner, 8.5 parts of 3,5-di-t-butyl-4-hydroxyphenyl laurate are obtained as a pale yellow viscous oil.

Analysis.—Calculated for $C_{26}H_{44}O_3$: C, 77.18%; H, 10.96%. Found: C, 77.48%; H, 10.97%.

Example 16.—3,5 - di - t - butyl-4-hydroxyphenyl acetate.—2,6 - di - t-butyl-1,4-hydroquinone (22.2 parts) is treated with 7.85 parts of acetyl chloride in the presence of 7.9 parts of pyridine dissolved in 135 parts of benzene as described in Example 4. The reaction mixture is stirred under nitrogen at 45–50° for 3 hours and is then cooled to room temperature. The precipitated pyridine hydrochloride is filtered and washed with benzene and the combined filtrate and washings, after drying over magnesium sulfate, are evaporated to dryness in vacuo. The residue (23.5 parts) crystallizes to a yellow solid, and after recrystallization from petroleum ether, 13 parts of 3,5-di-t-butyl-4-hydroxyphenyl acetate are obtained as white crystals, M.P. 86–89°.

Analysis.—Calculated for $C_{16}H_{24}O_3$: C, 72.62%; H, 9.15%. Found: C, 72.43%; H, 9.18%.

Example 17.—3,5 - di-t-butyl-4-hydroxyphenyl docosanoate.—2,6-di-t-butyl-1,4-hydroquinone (5.55 parts) is treated with 9 parts of docosanoyl chloride (prepared from docosanoic acid and phosphorus trichloride) dissolved in 18 parts of benzene in the presence of 1.98 parts of pyridine dissolved in 27 parts of benzene as described in Example 4. The reaction is carried out and the crude product (13 parts) is isolated as described in Example 4, except that the benzene filtrate from pyridine hydrochloride is dried over sodium sulfate before the benzene is removed. The crude crystalline product is recrystallized twice from methanol, plus a small amount of isopropanol and finally is triturated with hexane at room temperature. The insoluble material is filtered off and washed with a minimum amount of hexane, and the clear hexane filtrate is refrigerated, filtered, and the white crystals washed once with ice-cold hexane. In this manner, 3 parts of 3,5-di-t-butyl-4-hydroxyphenyl docosanoate are obtained, M.P. 59–61.5°.

Analysis.—Calculated for $C_{36}H_{64}O_3$: C, 79.35%; H, 11.84%. Found: C, 79.15%; H, 11.80%.

Example 18.—3,5 - di - t-butyl-4-hydroxyphenyl β-(3,5-di - t - butyl-4-hydroxyphenyl)propionate.—2,6-di-t-butyl-1,4-hydroquinone (6.66 parts) is treated with 8.96 parts of β-(3,5-di-t-butyl-4-hydroxyphenyl)propionyl chloride dissolved in 14 parts of benzene in the presence of 2.37 parts of pyridine dissolved in 31 parts of benzene as described in Example 4. The reaction is carried out and the crude product (13.5 parts) is isolated as described in Example 4 except that the benzene filtrate from pyridine hydrochloride is dried over magnesium sulfate before the benzene is removed. The crude, crystalline product is recrystallized from n-hexane. In this manner, 9 parts of white, crystalline 3,5-di-t-butyl-4-hydroxyphenyl, β-(3,5-di-t-butyl-4-hydroxyphenyl)propionate are obtained, M.P. 158–163°.

*Analysis.*—Calculated for $C_{31}H_{46}O_4$: C, 77.13%; H, 9.61%. Found: C, 76.86%; H, 9.63%.

Part III.—Stabilization of unstable material

Example 19.—Stabilization of polypropylene.—Unstabilized polypropylene powder (Hercules Profax 6501) is thoroughly blended with 0.5% by weight of 3,5-di-t-butyl-4-hydroxyphenyl β-(n-octadecylmercapto) propionate. The blended material is then milled on a two roller mill at 182° for 5 minutes, after which time the stabilized polypropylene is sheeted from the mill and allowed to cool.

The milled polypropylene sheet is then cut into small pieces and pressed for 7 minutes on a hydraulic press at 218° and 2000 pounds per square inch pressure. The resultant sheet of 25 mil thickness is then tested for resistance to accelerated aging in a forced draft oven at 149°. The resultant composition of 0.5% by weight of 3,5-di-t-butyl - 4-hydroxyphenyl β-(n-octadecylmercapto)propionate and polypropylene is stabilized against oxidative deterioration for more than 1000 hours. The unstabilized polypropylene deteriorates after only 3 hours.

In like manner as in this example, stabilized compositions of polypropylene are prepared having 0.5% by weight of each of the following:

3,5-di-t-butyl-4-hydroxyphenyl stearate
Bis(3,5-di-t-butyl-4-hydroxyphenyl) adipate
Bis(3,5-di-t-butyl-4-hydroxyphenyl) sebacate
Bis(3,5-di-t-butyl-4-hydroxyphenyl) 3,3'-thiodipropionate
Bis(3,5-di-t-butyl-4-hydroxyphenyl) terephthalate
3-t-butyl-4-hydroxyphenyl β-(n-octadecylmercapto) propionate
Bis(3-t-butyl-4-hydroxyphenyl) adipate
Bis(3-t-butyl-4-hydroxyphenyl) sebacate
Bis(3-t-butyl-4-hydroxyphenyl) 3,3'-thiodipropionate
Bis(3-t-butyl-4-hydroxyphenyl) terephthalate
3,5-di-t-butyl-4-hydroxyphenyl laurate
3,5-di-t-butyl-4-hydroxyphenyl acetate
3,5-di-t-butyl-4-hydroxyphenyl docosanoate
3,5 - di - t - butyl-4-hydroxyphenyl β-(3,5-di-t-butyl-4-hydroxyphenyl)propionate.

In a similar manner as in this example, stable compositions of polypropylene are prepared with 0.1% by weight of a compound according to each of the preceding examples in Part II, together with 0.5% by weight of di-lauryl-β-thiodipropionate. In some cases the improvement is so remarkable that a synergistic effect is observed in the oven-aging test. For example, 0.1% of 3,5-di-t-butyl-4 - hydroxyphenyl β - (n-octadecylmercapto)propionate stabilizes polypropylene for 53 hours, while 0.5% of di-lauryl - β - thiodipropionate stabilizes polypropylene 335 hours, but a combination of these two stabilizers in the above amounts stabilizes polypropylene 665 hours or 277 hours beyond what could be predicted on the basis of a mere additive effect.

Example 20.—Stabilization of mineral oil.—A water-white, refined (U.S.P. grade) mineral oil (Esso Primol D) is stabilized under the following test conditions.

A sample of mineral oil (10 parts) is placed in a Sligh-type oxidation flask filled with oxygen at room temperature (25°) and atmospheric pressure. Thereafter, the flask is sealed to form a system having a mercury manometer which measures the pressure changes as oxygen is absorbed by the sample in the flask. The sample is then heated at 150° until the manometer registers a decrease of 300 mm. Hg pressure within the flask with reference to the maximum pressure obtained at 150°. The stabilized mineral oil contains 0.1% by weight of 3,5-di-t-butyl-4-hydroxyphenyl β-(n-octadecylmercapto)propionate.

Example 21.—Stabilization of a resin containing elastomer.—High impact polystyrene resin containing elastomer (i.e. butadiene-styrene) is stabilized against loss of elongation properties by incorporation of 0.5% by weight of 3,5 - di - t -butyl- 4-hydroxyphenyl β-(n-octadecylmercapto)propionate. Under the test conditions described hereinbelow, the stabilized resin retains a higher percentage of its original elongation properties, whereas the unstabilized resin retains less elongation properties.

The unstabilized resin is dissolved in chloroform and the stabilizer then added, after which the mixture is cast on a glass plate and the solvent evaporated to yield a uniform film which, upon drying, is removed and cut up, and then pressed for 7 minutes at a temperature of 163° and a pressure of 2000 pounds per square inch into a sheet of uniform thickness (25 mil). The sheets are then cut into strips, approximately 4 x 0.5 inches. A portion of these strips is then measured for length of elongation in the Instron tensile tester (Instron Engineering Corporation, Quincy, Mass.). The remaining portion of the strips is aged in a forced draft oven for 6 weeks at 75° and thereafter tested for elongation.

Similar results are obtained with a terpolymer of acrylonitrile-butadiene-styrene.

What is claimed is:

1. A composition of matter stabilized against deterioration which comprises polyolefin material normally subject to deterioration and a stabilizing amount of the stabilizing compound of the formula:

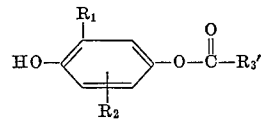

wherein:
  $R_1$ is alkyl of 3 to 8 carbon atoms,
  $R_2$ is a member selected from the group consisting of hydrogen and alkyl of 1 to 8 carbon atoms,
  $R_3'$ is a member selected from the group consisting of alkylthioalkyl of 2 to 24 carbon atoms, alkyl of 1 to 24 carbon atoms, and the radical of the formula

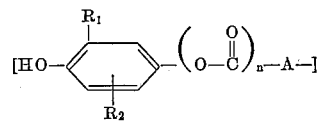

wherein:
  $R_1$ and $R_2$ are the same as above, and
  $n$ is a member selected from the group consisting of 0 and 1, and
  A is a member selected from the group consisting of lower alkylene, lower alkylenethio(lower alkylene), and phenylene.

2. A composition of matter as claimed in claim 1 wherein the polyolefin material is polypropylene and the stabilizing compound is 3,5-di-t-butyl-4-hydroxyphenyl β-(n-octadecylmercapto) propionate.

3. A composition of matter as claimed in claim 1 wherein the polyolefin material is polypropylene and the stabilizing compound is bis(3,5-di-t-butyl-4-hydroxyphenyl) adipate.

4. A composition of matter as claim in claimed 1 wherein the polyolefin material is polypropylene and the stabilizing compound is bis(3,5 - di-t-butyl-4-hydroxyphenyl) sebacate.

5. A composition of matter as claimed in claim 1 wherein the polyolefin material is polypropylene and the stabilizing compound is bis(3,5 - di-t-butyl-4-hydroxyphenyl) 3,3'-thiodipropionate.

6. A composition of matter as claimed in claim 1 wherein the polyolefin material is polypropylene and the stabilizing compound is bis (3,5-di-t-butyl-4-hydroxyphenyl) terephthalate.

7. A composition of matter as claimed in claim 1 wherein the polyolefin material is polypropylene and the stabilizing compound is 3-t-butyl-4-hydroxyphenyl β-n-(octadecylmercapto) propionate.

8. A composition of matter as claimed in claim 1 wherein the polyolefin material is polypropylene and the stabilizing compound is bis(3-t-butyl-4-hydroxyphenyl) adipate.

9. A composition of matter as claimed in claim 1 wherein the polyolefin material is polypropylene and the stabilizing compound is bis(3-t-butyl-4-hydroxyphenyl) sebacate.

10. A composition of matter as claimed in claim 1 wherein the polyolefin material is polypropylene and the stabilizing compound is bis(3-t-butyl-4-hydroxyphenyl) 3,3'-thiodipropionate.

11. A composition of matter as claimed in claim 1 wherein the polyolefin material is polypropylene and the stabilizing compound is bis(3-t-butyl-4-hydroxyphenyl) terephthalate.

12. A composition of matter as claimed in claim 1 wherein the polyolefin material is polypropylene and the stabilizing compound is 3,5-di-t-butyl-4-hydroxyphenyl β-(3,5-di-t-butyl-4-hydroxyphenyl)propionate.

13. A composition of matter as claimed in claim 1 wherein the polyolefin material is polypropylene and the stabilizing compound is 3,5-di-t-butyl-4-hydroxyphenyl acetate.

14. A composition of matter as claimed in claim 1 wherein the polyolefin material is polypropylene and the stabilizing compound is 3,5-di-t-butyl-4-hydroxyphenyl docosanoate.

15. A composition of matter as claimed in claim 1 wherein the polyolefin material is polypropylene and the stabilizing compound is 3,5-di-t-butyl-4-hydroxyphenyl stearate.

16. A composition of matter as claimed in claim 1 wherein the polyolefin material is polypropylene and the stabilizing compound is 3,5-di-t-butyl-4-hydroxyphenyl laurate.

17. A composition of matter which comprises polyolefin material which is normally subject to deterioration and a stabilizer system consisting essentially of a mixture of (a) a stabilizer of the formula

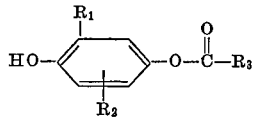

wherein:
$R_1$ is an alkyl group of 3 to 8 carbon atoms,
$R_2$ is a member selected from the group consisting of alkyl of 1 to 8 carbon atoms, and hydrogen,
$R_3$ is a member selected from the group consisting of alkyl of 1 to 24 carbon atoms, alkylthioalkyl of 2 to 24 carbon atoms, and the radical of the formula:

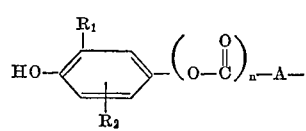

wherein:
A is a member selected from the group consisting of lower alkylene, lower alkylenethio(lower alkylene), and phenylene,
$n$ is a member selected from the group consisting of 0 and 1, and
$R_1$ and $R_2$ are as described above, and (b) a stabilizer of the formula:

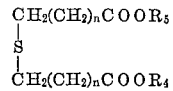

wherein:
$n$ is a member selected from the group consisting of 1 and 2, and
$R_4$ and $R_5$ are each independently an alkyl group of 8 to 24 carbon atoms.

18. A composition of matter as defined in claim 17 wherein the polyolefin material is polypropylene.

19. A composition of matter as defined in claim 17 wherein the polyolefin material is polypropylene, (a) is 3,5 - di - t - butyl-4-hydroxyphenyl β-(n-octadecyl), mercapto propionate, (b) is di-lauryl-β-thiodipropionate.

20. A stabilizer system consisting essentially of
(a) a stabilizer of the formula

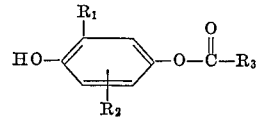

wherein:
$R_1$ is an alkyl group of 3 to 8 carbon atoms,
$R_2$ is a member selected from the group consisting of alkyl of 1 to 8 carbon atoms, and hydrogen,
$R_3$ is a member selected from the group consisting of alkyl of 1 to 24 carbon atoms, alkylthioalkyl of 2 to 24 carbon atoms, and the radical of the formula:

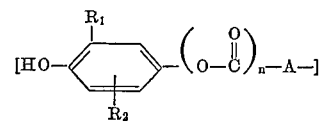

wherein:
A is a member selected from the group consisting of lower alkylenethio(lower alkylene), and phenylene,
$n$ is a member selected from the group consisting of 0 and 1, and
$R_1$ and $R_2$ are as defined above, and (b) a stabilizer of the formula

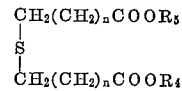

wherein:
$n$ is a member selected from the group consisting of 1 and 2, and
$R_4$ and $R_5$ are each independently an alkyl group of 8 to 24 carbon atoms.

References Cited

UNITED STATES PATENTS

| | | | |
|---|---|---|---|
| 3,255,136 | 6/1966 | Hecker et al. | 260—45.85 |
| 3,303,211 | 2/1967 | Peterson et al. | 260—471 |
| 3,330,859 | 7/1967 | Dexter et al. | 260—473 |
| 3,338,833 | 8/1967 | Dexter et al. | 260—45.85 |
| 3,364,250 | 1/1968 | Dexter et al. | 260—473 |
| 3,367,908 | 2/1968 | Dexter et al. | 260—45.85 |

DONALD E. CZAJA, Primary Examiner

V. P. HOKE, Assistant Examiner

U.S. Cl. X.R.

99—163; 252—393, 404; 260—598, 601, 666, 881